United States Patent [19]

Latini

[11] Patent Number: 4,582,165

[45] Date of Patent: Apr. 15, 1986

[54] PACK FRAME AND TREE STAND

[76] Inventor: Lawrence R. Latini, Lodi Station Rd., Lodi, N.Y. 14860

[21] Appl. No.: 763,583

[22] Filed: Aug. 8, 1985

[51] Int. Cl.⁴ .................. B62D 51/04; A47F 4/02; A47F 3/10; A47F 3/26
[52] U.S. Cl. ........................... 182/20; 182/187; 280/1.5; 224/155; 108/152
[58] Field of Search ............... 182/187, 188, 20; 224/155; 297/230; 280/1.5; 108/152

[56] References Cited

U.S. PATENT DOCUMENTS

| | | | |
|---|---|---|---|
| 2,982,337 | 5/1961 | Arena | 182/187 |
| 3,065,821 | 11/1962 | Hundley, Jr. | 182/187 |
| 3,232,664 | 2/1966 | McBride | 182/187 |
| 3,241,734 | 3/1966 | Gray | 182/187 |
| 3,332,698 | 7/1967 | Cafra | 182/187 |
| 3,352,379 | 11/1967 | Riggs | 182/187 |
| 3,353,629 | 11/1967 | Brunes | 182/187 |
| 3,368,725 | 2/1968 | Martin | 224/155 |
| 3,513,940 | 5/1970 | Ussery | 182/187 |
| 3,730,294 | 5/1973 | Thurmond | 224/155 |
| 3,817,350 | 6/1974 | Gray | 182/187 |
| 4,022,292 | 5/1977 | Van Gompel | 182/187 |
| 4,045,040 | 8/1977 | Fails | 182/20 |
| 4,120,379 | 10/1978 | Carter | 182/187 |
| 4,134,474 | 1/1979 | Stavenau | 182/187 |
| 4,148,376 | 4/1979 | Campbell | 182/187 |
| 4,236,602 | 12/1980 | Leggett | 182/187 |
| 4,452,338 | 6/1984 | Untz | 182/187 |
| 4,456,094 | 6/1984 | Brander | 182/20 |

Primary Examiner—Reinaldo P. Machado
Attorney, Agent, or Firm—Jones, Tullar & Cooper

[57] ABSTRACT

A pack frame and tree stand assembly is comprised of two major components. A back engaging support platform serves as the pack frame in the back pack mode and as the tree engaging support platform in the tree stand mode. A pack carrying seat is the second main component and is carried by spaced framework members which are pivotably attached to the back engaging support platform. In the back pack mode this second component forms a shelf upon which a pack can be placed. By being rotated through generally about 90°, the pack carrying seat becomes the seat portion of the tree stand. The stand is attachable to a tree by a tree encircling line which is carried by, and is securable to the frame of the seat of the tree stand.

17 Claims, 13 Drawing Figures

PACK FRAME AND TREE STAND

FIELD OF THE INVENTION

The present invention is directed generally to a pack frame and tree stand assembly. More particularly, the present invention is directed to a unitary structure usable either as a pack frame or as a tree stand. Most specifically, the present invention is directed to a combined pack frame and tree stand. The pack frame and tree stand assembly consists of two main components, a back engaging, support platform and a pack carrying seat. The pack carrying seat member is pivotably attached to the back engaging support platform and is shiftable between a pack supporting position and a seat forming position. The pack frame and tree stand assembly can also function as a litter, handtruck, canoe support, or the like and provides an assembly truly usable by a hunter or outdoorsman as a backpack or pack frame and as a tree stand.

DESCRIPTION OF THE PRIOR ART

Hunters and outdoor enthusiasts often utilize tree stands either to observe various animals or as a hunting platform. This is particularly true of bow hunters who use archery equipment during hunting. In such hunting, it is advantageous to be elevated above the ground on some type of stand or platform. Initially, the hunter either merely stood on the limb of a tree or carried a crude platform with him into the woods and attempted to secure the platform in the tree. As the sport of bow hunting has gained popularity, the need for a better tree stand has also become evident. A number of prior devices have been advanced as being usable as tree stands. Exemplary of these are the following patented devices:

| U.S. Pat. No. | Inventor |
|---|---|
| 2,982,337 | Arena |
| 3,065,821 | Hundley, Jr. |
| 3,241,734 | Gray |
| 3,353,629 | Brunes |
| 3,368,725 | Martin |
| 3,513,940 | Ussery |
| 3,730,294 | Thurmond |
| 3,817,350 | Gray |
| 4,022,292 | Van Gompel |
| 4,120,379 | Carter |
| 4,148,376 | Campbell, Jr. |
| 4,236,602 | Leggett |

A number of the above devices are directed to tree stands and seats which are adapted to be transported on the back of the hunter. However, they are not actually structured or intended for use as a backpack or pack frame as well as a tree stand or seat. Instead, these devices show an assembly that can be secured to the back of a person for transport into the hunting area. As such, these devices may actually be a hindrance to the hunter. They preclude the hunter from being able to transport other supplies or equipment on his back since they are not intended for use as pack frames.

Quite often the hunter or outdoorsman is desirous of spending several days in a remote location which very frequently is not accessible by motorized vehicle. Thus the hunter must transport food, shelter, hunting equipment, safety gear and the like to the remote location by himself. The preferred means of doing this is through the use of a pack frame or backpack that can be loaded with the necessary gear and then carried by the hunter on his back. Pack frames have become quite well developed and will allow the user to carry 40 or more pounds of gear in a generally comfortable, secure manner. These pack frames or backpacks are usable only as such and once the hunter has arrived at his campsite or the like, the pack frame is unloaded and set aside.

In some instances, the hunter or outdoorsman may require a litter or hand truck assembly for use either to transport a carcass out of the woods to a game registration station, or perhaps to use around a remote cabin or camp such as for hauling firewood or the like. Although the desirability of such an additional piece of equipment is unquestioned, there is a practical limit to the amount of gear that a person can safely and comfortably transport. The prior art devices have not provided a satisfactory solution to this problem.

In a like manner, there may arise an instance in which the hunter or outdoorsman is using a canoe to reach an area, and it becomes necessary to portage the canoe. This is usually done by putting the canoe over one's head and by supporting it as best one can. Any additional support that could be added by a pack frame or backpack assembly would be beneficial, but this is generally not the case in the instance of pack frames and is certainly not a function provided by the tree stands of the prior art.

While a number of prior art devices disclose and discuss tree stands, seats, or platforms that can be transported on the back of a person, they do not function as a true pack frame or backpack assembly. In a similar manner, the prior art pack frames and backpacks, while being designed and structured to facilitate the transport of loads on a user's back, are not multi-purpose assemblies. Thus the need exists for a tree stand and pack frame that is a true pack frame and is usable as such, but which is also usable as a tree stand, seat and platform. The tree stand and pack frame assembly in accordance with the present invention provides such a device.

SUMMARY OF THE INVENTION

It is an object of the present invention to provide a pack frame and tree stand assembly.

Another object of the present invention is to provide a pack frame and tree stand assembly structured to function as a true pack frame.

A further object of the present invention is to provide a pack frame and tree stand assembly structured to form a stable, secure tree stand.

Still another object of the present invention is to provide a pack frame and tree stand assembly adaptable for use as a litter, handtruck or the like.

Yet a further object of the present invention is to provide a pack frame and tree stand assembly that is lightweight, durable, and quiet.

Still yet another object of the present invention is to provide a pack frame and tree stand assembly that is adjustable for various sized trees and various tree inclinations.

Even yet a further object of the present invention is to provide a pack frame and tree stand assembly that is adjustable for use by persons of various heights.

As will be discussed in greater detail in the description of the preferred embodiment which is set forth hereinafter, the pack frame and tree stand assembly in accordance with the present invention comprises two main components; a back engaging, support platform, and a pack carrying seat structure. The back engaging support platform is structured to form a generally vertical pack frame or backpack in the pack frame mode of use, and to act as a generally horizontal, tree trunk engaging support platform in the tree stand mode. The pack carrying seat component is pivotably attached at one end to the back engaging support platform and is rotatable through generally about 90°. When the assembly in accordance with the present invention is being used as a backpack, the pack carrying seat is disposed generally perpendicular to the support platform and acts as a support shelf at the lower end of the pack frame to support the base of the pack or other equipment to be carried on the pack frame. When the assembly in accordance with the present invention is used as a tree stand, the pack carrying seat is rotated through about 90° and the obverse side of the pack support shelf, which is now generally parallel to the support platform, acts as a seat which can support the weight of a hunter or outdoorsman once the tree stand has been properly secured to a tree.

In contrast to prior art tree stands, seats and platforms which were attachable to the back of the user merely to facilitate their transportation to the point of use, the pack frame and tree stand in accordance with the present invention is structured and functions as a true, usable pack frame. When used as a pack frame or backpack, the back engaging portion or component is structured to act as a pack frame which allows the user to support and transport heavy loads in a comfortable manner. The pack carrying support shelf provides a solid base upon which to place packs or other articles that are to be transported.

Upon conversion to a tree stand or platform, the assembly in accordance with the present invention provides a safe, stable, platform on which the hunter or outdoorsman can either sit or stand. The seat, which has been pivoted 90° from the pack frame orientation, abuts the tree trunk and forms a part of the tree securement assembly. The stand's user can either sit on the seat or can stand on the support platform.

The pack frame and tree stand assembly in accordance with the present invention is also adaptable for use as a litter or hand truck, and can also be used as a portage facilitating support for a canoe. In contrast to prior art devices which were usable only as a tree stand or platform, the pack frame and tree stand in accordance with the present invention is capable of being adapted to serve a number of functions and is thereby much more valuable to the hunter or outdoorsman than either a pack frame or tree stand alone would be.

The pack frame and tree stand assembly in accordance with the present invention is fabricated from light weight, high strength materials so it is not heavy or bulky, yet is strong and durable. It is adjustable so that it can be used by persons of varying heights. The same adjustment capability allows the assembly, when used as a tree stand, to be adjusted to compensate for a supporting tree that is not vertical. Thus even though the tree itself may be inclined, the tree stand itself can be adjusted so that it will be generally level.

The pack frame and tree stand assembly in accordance with the present invention provides a truly functional pack frame assembly that the user can utilize to transport equipment on his back to a remote area. Once there, the pack frame and tree stand assembly can be quickly converted into a tree stand that provides a safe, secure, stable support which does not harm the tree and which can be quickly and securely attached to the tree. The pack frame and tree stand assembly in accordance with the present invention is far superior to prior art devices and affords a structure that is of benefit and which is utilizable by a hunter or outdoorsman without being a possible hindrance as are the prior art devices.

BRIEF DESCRIPTION OF THE DRAWINGS

While the novel features of the pack frame and tree stand assembly in accordance with the present invention are set forth with particularity in the appended claims, a full and complete understanding of the invention may be had by referring to the detailed description of the preferred embodiment, as is set forth hereinafter, and as may be seen in the accompanying drawings in which:

DESCRIPTION OF THE PREFERRED EMBODIMENT

Figure 1:
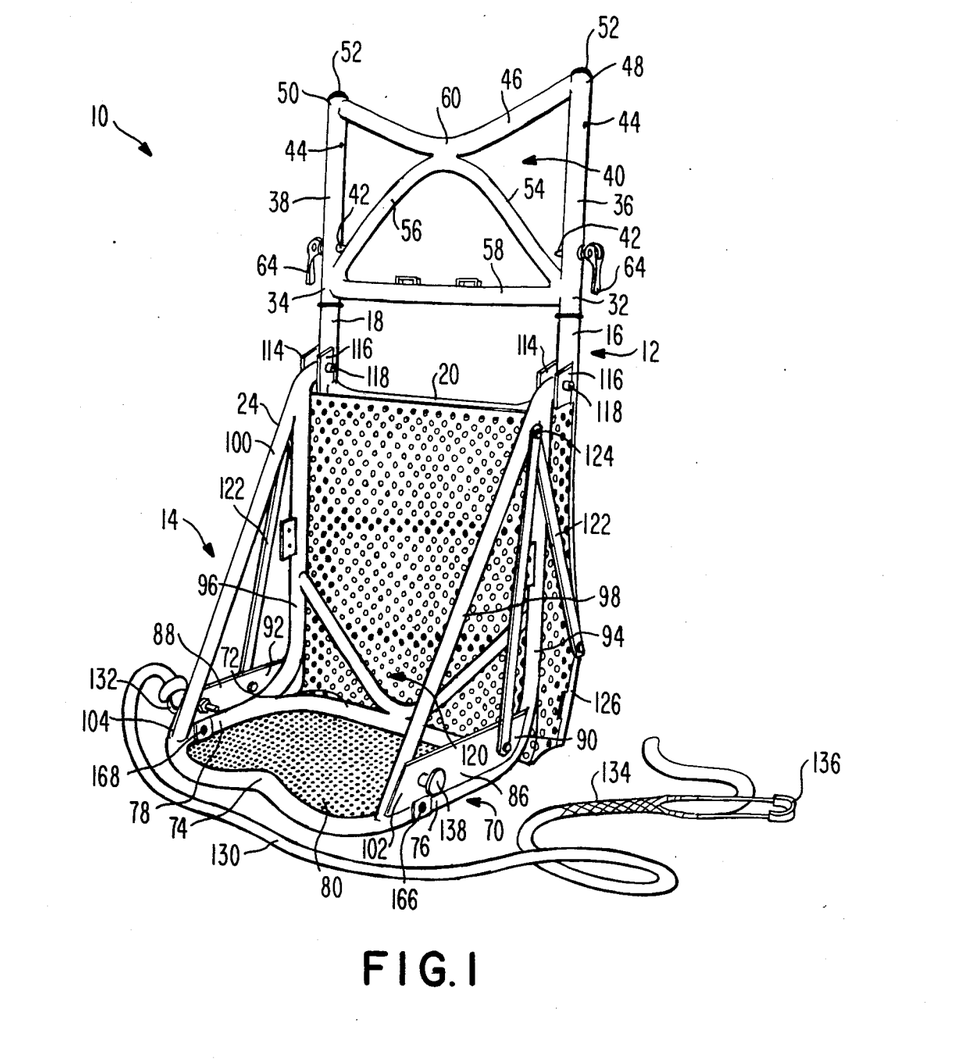
FIG. 1 is a perspective view of the pack frame and tree stand assembly in accordance with the present invention showing the assembly in the pack frame mode.

Referring initially to FIG. 1, there may be seen generally at 10 a preferred embodiment of a pack frame and tree stand assembly in accordance with the present invention. Pack frame and tree stand assembly 10 is shown in the pack frame mode in FIG. 1. By turning to FIG. 2, the same pack frame and tree stand assembly 10 may be seen in the tree stand mode. As may be seen in both FIGS. 1 and 2, the pack frame and tree stand assembly is comprised of two main components, a back engaging support platform, generally at 12, and a pack carrying, seat member, generally at 14, which is pivotably secured to the back engaging support platform 12 and which is movable generally through 90°, as may be seen in FIGS. 1 and 2, between the pack frame mode of FIG. 1 and the tree stand mode of FIG. 2.

Figure 5:
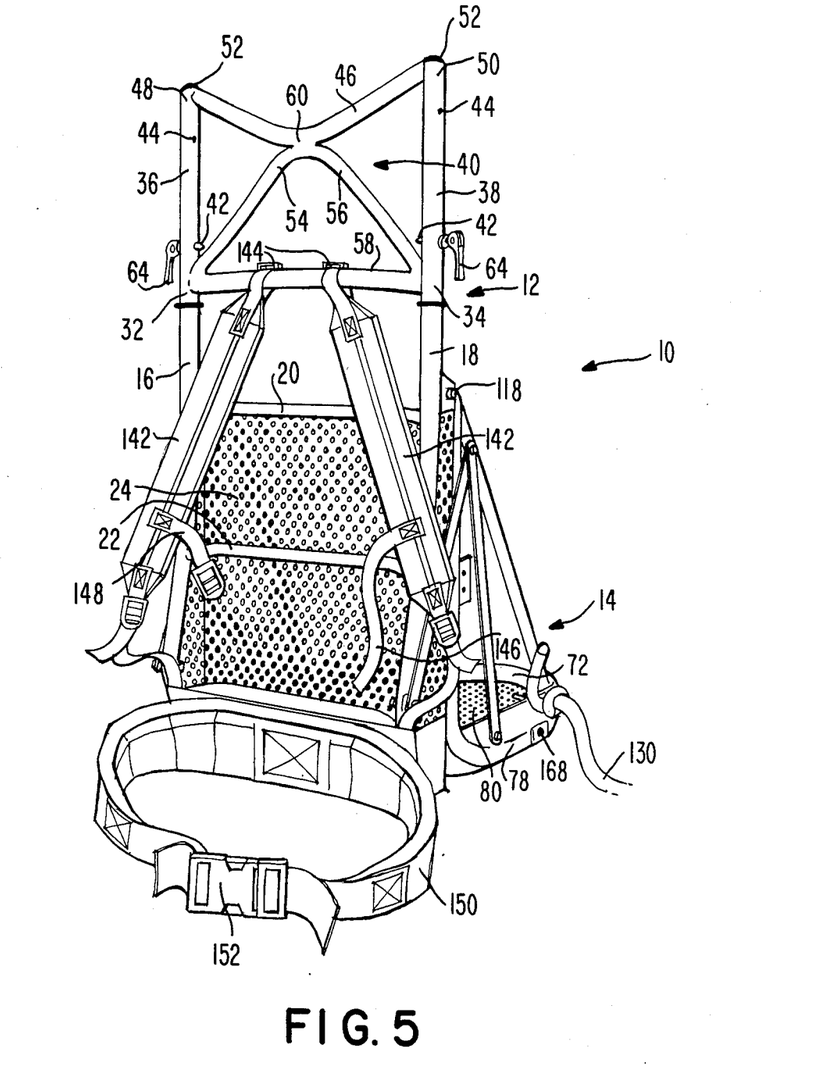
FIG. 5 is a perspective view of the pack frame mode showing the wearer encircling straps.

Turning again to FIGS. 1 and 2 as well as to FIG. 5, the back engaging support platform, generally at 12 is comprised of a pair of generally parallel elongated frame members 16 and 18. These frame members are joined together intermediate their ends by several spaced transverse frame cross members such as are shown at 20 and 22, as may be seen in FIG. 5. Each of the transverse frame cross members 20 and 22 is attached at its ends to the elongated frame members 16 and 18 to thereby form the generally rectangular support platform and back engaging component 12. A light weight, strong support panel 24 is attached to frame members 16 and 18 and to transverse frame cross members 20 and 22 and forms a support platform upon which a person may stand when the assembly 10 is used in the tree stand mode, as seen in FIG. 2.

In the preferred embodiment, and as will be discussed generally hereinafter, the elongated frame members 16 and 18, the frame cross members 20 and 22 and other additional structural elements are formed of hollow, light weight, strong metal alloy tubing with the various elements being joined to each other by welding. Further the various support panels are preferably made of metal. However, it will be obvious to one of skill in the art that a number of alternative materials such as glass fiber reinforced resins, carbon fiber reinforced composites and the like could be utilized in the formation of the pack frame and tree stand assembly in accordance with the present invention. The primary criteria are strength durability, dependability, lightness, and ease of fabrication. A number of materials which could be utilized in the pack frame and tree stand of the present invention satisfy these requirements. However, for simplicity of discussion, metal will be used hereinafter in the discussion of the assembly of the present invention.

Figure 6:
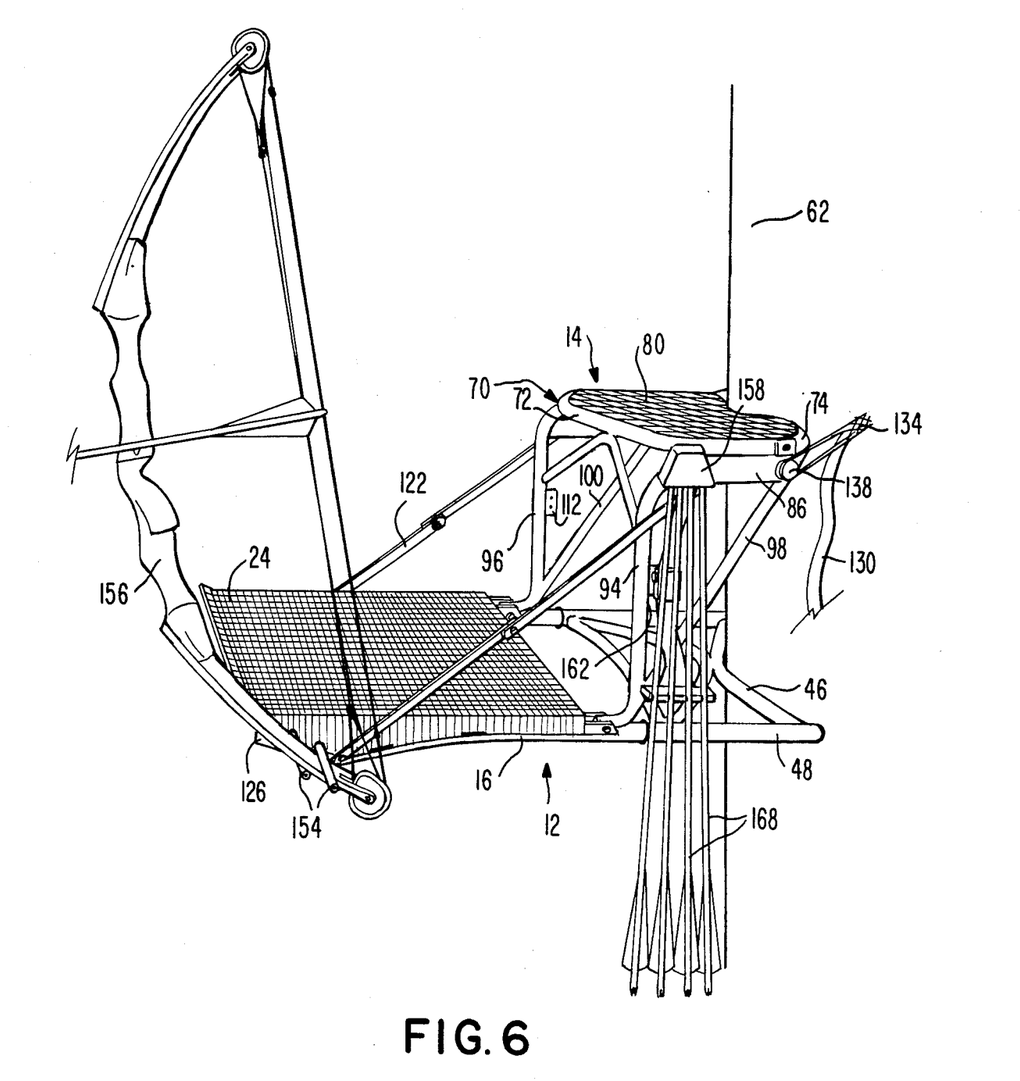
FIG. 6 is a perspective view of the tree stand mode and showing bow and arrow support means.
Figure 7:
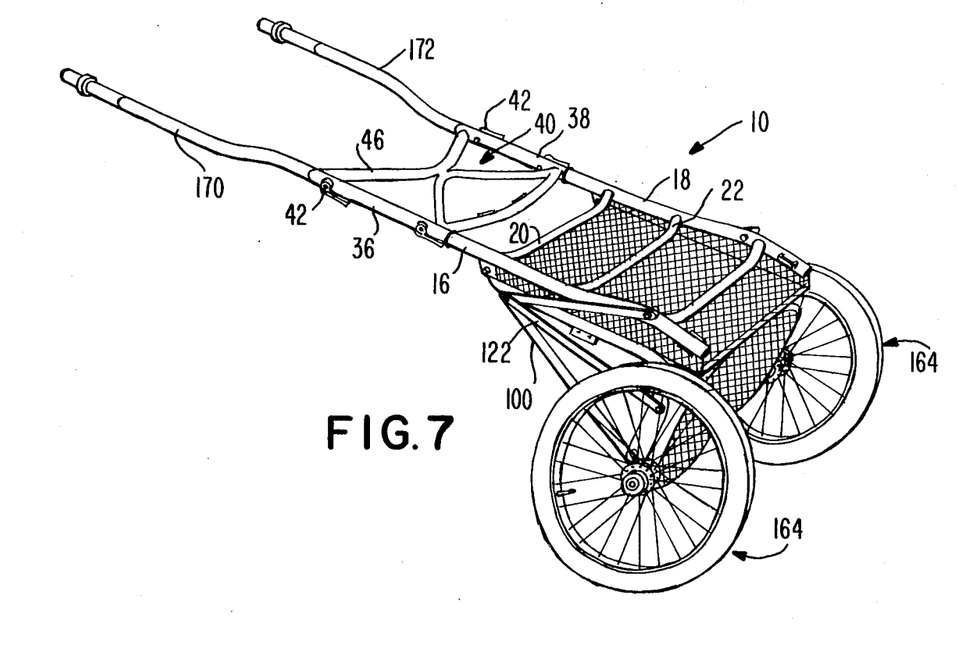
FIG. 7 is a perspective view of the pack frame and tree stand assembly adapted for use a wheeled litter.

Support panel 24 may be perforated metal, as seen in FIGS. 1, 2, 4, and 5 or alternatively may be an expanded metal panel assembly, as seen in FIGS. 6 and 7. In either alternative, the primary consideration is high strength and light weight. The support panel 24 further may be suitably formed or treated to render it non-skid so that the user will not be apt to slip.

Figures 2, 3:
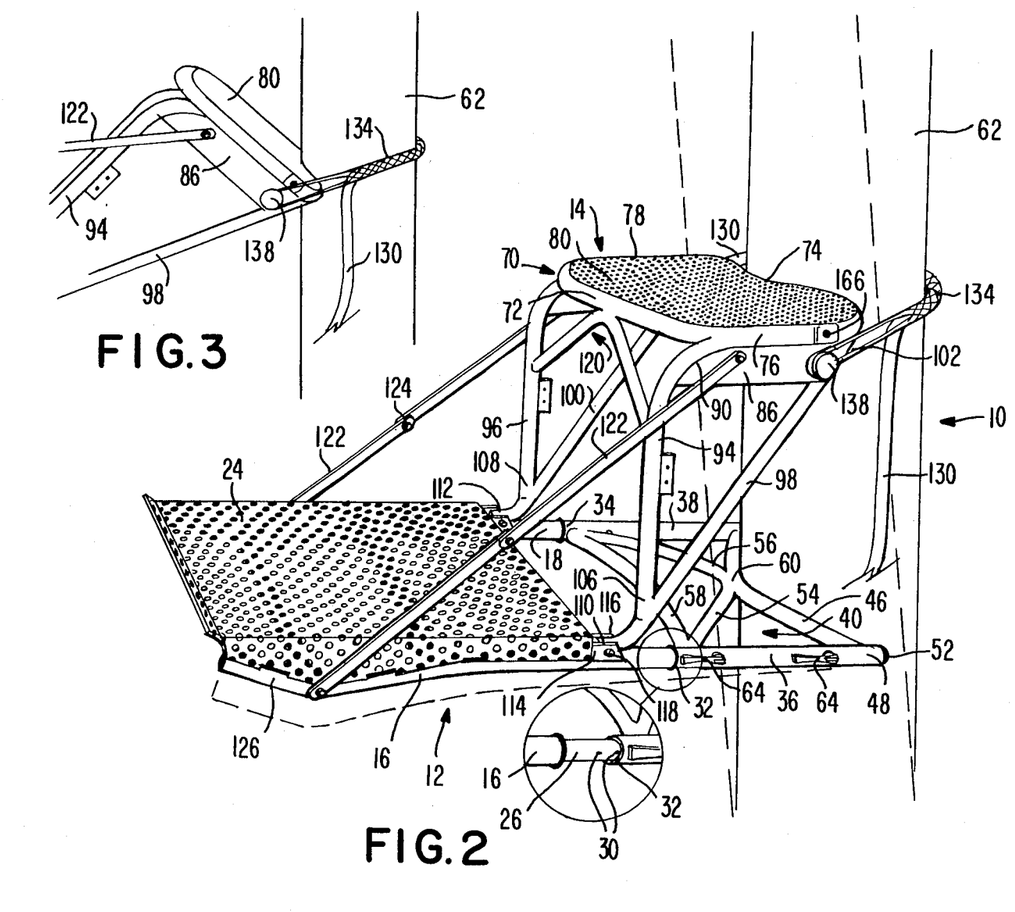
FIG. 2 is a perspective view of the assembly of the present invention and showing the tree stand mode.
FIG. 3 is a schematic perspective view of the seat portion of the tree stand mode during attachment of the stand to a tree.

First ends 26 and 28 of elongated frame members 16 and 18, respectively, which may be tubular or rectangular; for example, in cross-section, are of a reduced diameter, as may be seen in the encircled enlarged portion of FIG. 2, and have spaced adjustment holes 30. These reduced diameter tube ends 26, 28 are telescopingly received within hollow first ends 32 and 34 of corresponding frame extension members 36 and 38, having a corresponding tubular or other cross-section shape, of a back engaging support platform frame extension 40. Suitable quick release lock pins 42 pass through holes 44 in tubular frame extension members 36 and 38 and through spaced adjusting holes 30 in reduced diameter first ends 26 and 28 of elongated tubular frame members 16 and 18, respectively. An arcuate tubular member 46 is securely attached to second ends 48 and 50 of tubular extension frame members 36, 38 and extends therebetween. The second ends 48 and 50 of tubes 36 and 38 may be closed with suitable removable end caps 52. A generally isosceles triangle shaped reinforcement member having two equal length sides 54 and 56, and a base 58 is welded between tubular frame extension members 36 and 38 with the apex of triangle sides 54 and 56 intersecting at the mid-point 60 of arcuate tubular member 46, and with the ends of triangle base 58 being secured to extension members 36 and 38 generally adjacent their first ends 32 and 34, respectively.

During use of pack frame and tree stand assembly 10 as a tree stand, as may be seen in FIG. 2, arcuate tubular member 46 engages the generally correspondingly curved outer surface of a tree 62. It should be noticed that the surface of this member 46 is smooth and does not damage the tree. Since tree 62 may well not be vertical but instead may be inclined, as seen in dashed lines in FIG. 2, the position of platform extension 40 at the upper or inner end of back engaging support platform 12 may be adjusted with respect to pack carrying seat component 14. This is accomplished by actuation of camming levers 64 of quick release lock pins 42 to release these generally well known pins so that they can be pulled from their positions in aligned holes 30, in reduced diameter first ends 26 and 28 of frame members 16 and 18, and holes 44 in extension members 36 and 38. The extension frame members 36 and 38 can then be repositioned along reduced diameter tubes 26 and 28 and resecured by reinsertion of lock pins 42. This allows arcuate tubular member 46 to be offset from the seat assembly 14 to compensate for a nonvertical tree 62. Thus the back engaging support platform 12 may be kept generally horizontal when in the tree stand mode.

Figure 5A:
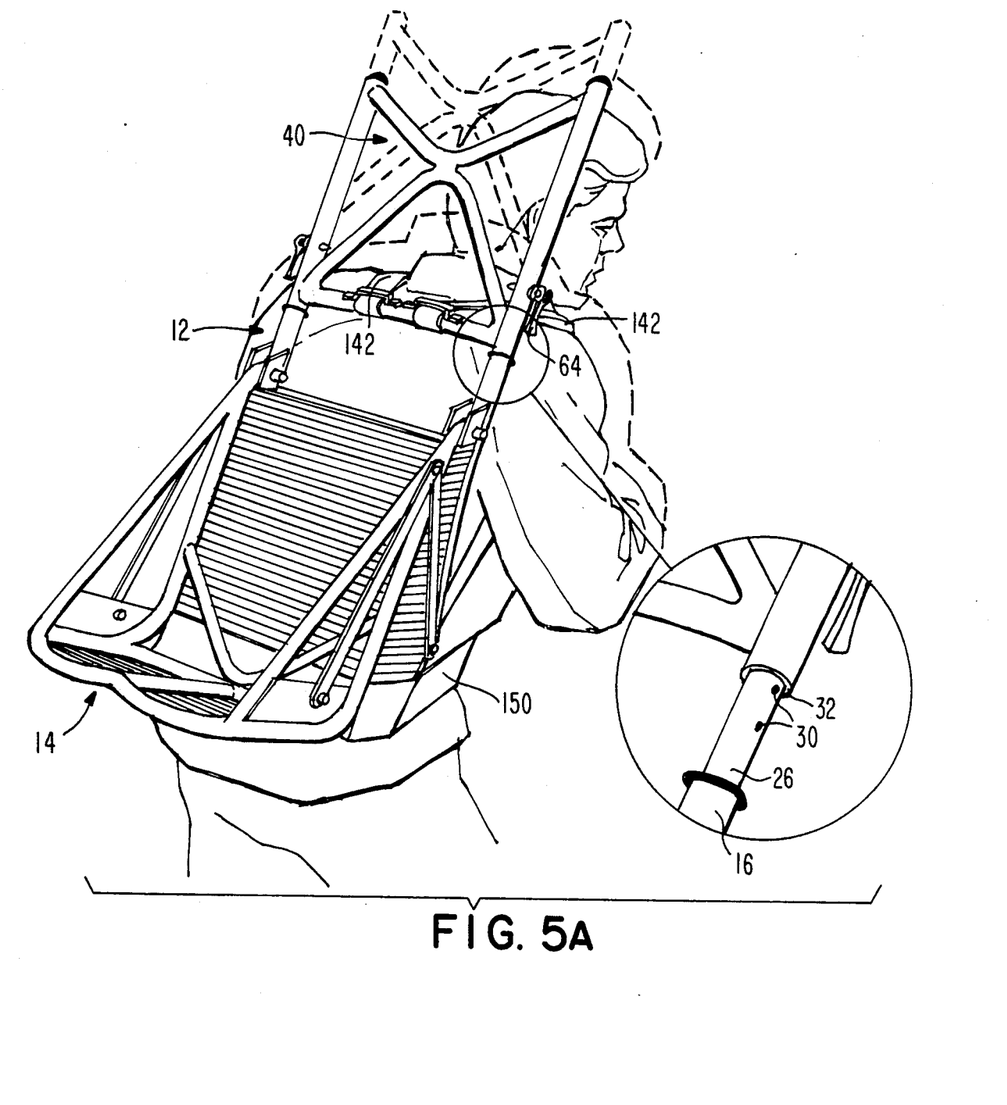
FIG. 5A is a perspective view of the pack frame in use and showing the height adjustability aspect of the invention.

In the backpack mode, as may be seen in FIG. 5A, adjustment of the position of frame extension 40 changes the overall length or height of the back engaging support platform 12 so that persons of various heights can comfortably carry the assembly 10. As may be seen in dashed lines in FIG. 5A, the length of the back engaging support platform 12 can be increased to make the pack frame comfortable for a taller person. This is easily accomplished by sliding the platform frame extension 40 upwardly by adjustment of the lock pins 42.

Turning again to FIGS. 1 and 2, pack carrying seat component 14 of pack frame and tree stand assembly 10 will now be discussed in detail. A somewhat kidney shaped tubular frame member 70, having a convex portion 72 and a concave portion 74 joined by spaced rounded side portions 76 and 78, and a central reinforcing brace 79, a seen in FIG. 1A, forms a frame for a seat/shelf panel 80 which is structured similarly to panel 24, which may also be of perforated or expanded metal, and which is attached to kidney shaped frame 70 by welding or other suitable means. Frame 70 and seat/shelf panel 80 combine to perform separate functions in each usage mode of the subject invention. When the assembly is in the pack frame mode shown in FIGS. 1, 1A, 4 and 5, frame 70 and panel 80 act as a shelf or support for articles such as a pack 82 carried by the pack frame. In the tree stand mode, as seen in FIGS. 2, 2A, 3, and 6, frame 70 and panel 80 form a seat and securement assembly.

As may be seen most clearly in FIGS. 1 and 2, a pair of spaced, generally right triangular frame elements are used to attach the seat/shelf frame 70 to the back engaging support platform 12. Each right triangular frame includes a frame flange 86, 88 joined to the underside of rounded side portions 76 and 78, respectively, of frame 70, and extending generally perpendicularly to seat/shelf panel 80 and parallel to each other. These frame flanges 86, 88 attach at first ends 90, 92 to straight frame legs 94, 96 and cooperate to form the right angle sides of the right triangular frame elements. Diagonal frame legs 98, 100 extend from second ends 102, 104 of frame flange 86, 88, respectively, to the apices 106 and 108 of the right triangular frame elements. These diagonals 98 and 100 each form the hypotenuse of the right triangular frame element of which it is a part. An extension leg 110, 112 of each diagonal frame leg 98, 100 extends beyond the apex of its triangle frame and is pivotably secured between spaced upright ears 114, 116 welded to elongated tubular frame members 16 and 18 of back engaging support platform 12 by suitable pivot pins or bolts 118. This allows the two right triangular frame elements and their attached kidney shaped frame 70 and seat/shelf panel 80 to pivot or rotate on extension legs 110 and 112 through an angle of generally 90° between the backpack and pack frame mode shown in FIG. 1 and the tree stand mode shown in FIG. 2.

Figure 1A:
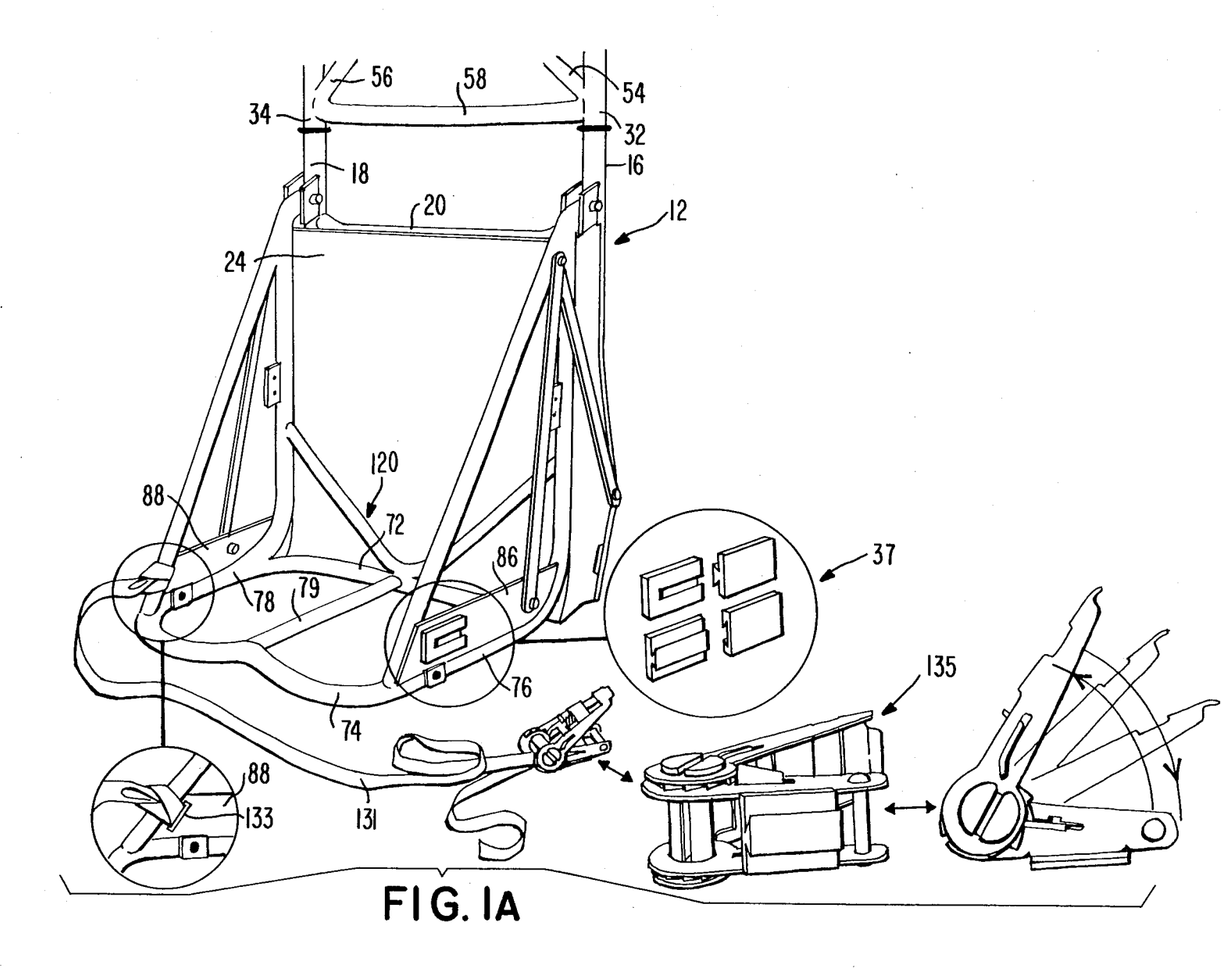
FIG. 1A is a perspective view similar to FIG. 1 and showing an alternative tree encircling web strap and ratchet tightening asembly.
Figure 4:
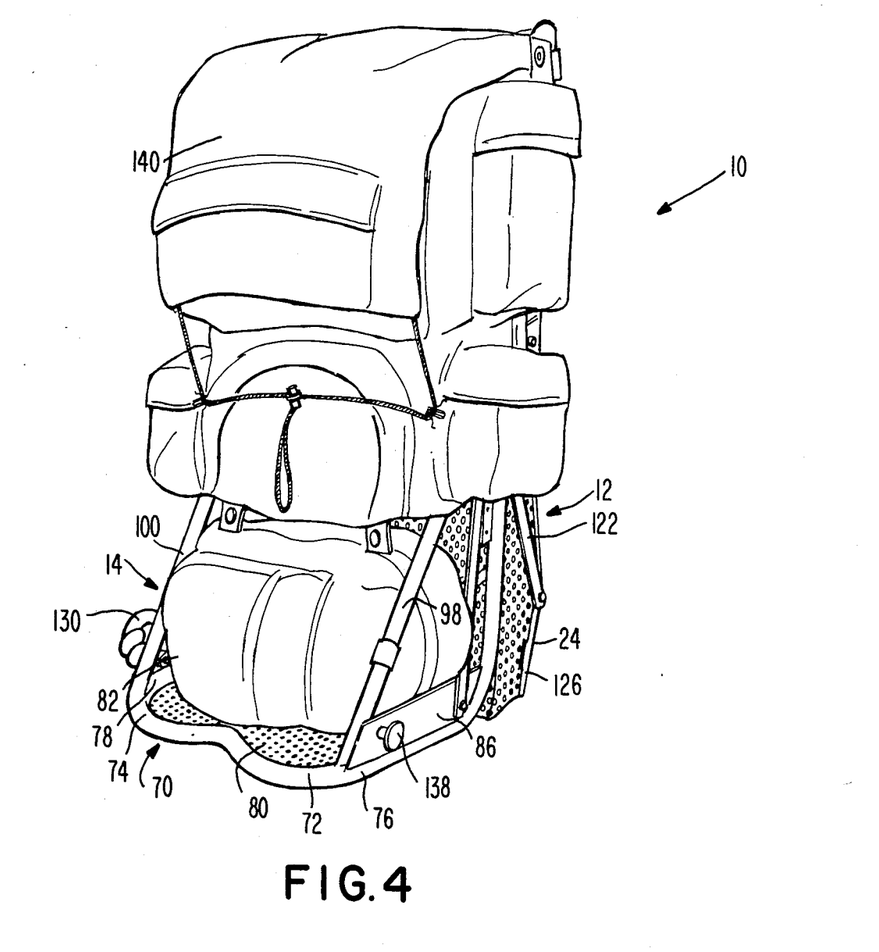
FIG. 4 is a perspective view of the pack frame and tree stand assembly in accordance with the present invention and showing the pack frame mode with attached packs.

To add stability to the pack carrying, seat assembly 14, a generally V-shaped reinforcing member 120 is placed between the straight frame legs 94 and 96 of the right triangular frame members with the point of the V-shaped reinforcing member 120 contacting the convex portion 72 of kidney shaped frame 70 generally at its mid-point and in alignment with central reinforcing brace 79, as seen in FIG. 1A. A foldable reinforcing strut 122 having a central pivot point 124 extends between each frame flange 86, 88 and a lower or outboard end 126, 128 of elongated tubular frame members 16 and 18 of back engaging support platform 12. When the assembly in accordance with the present invention is used as a tree stand, the reinforcing struts 122 aid in supporting support panel 24 and its framework. In the pack frame mode, these struts 122 are folded out of the way, as can be seen in FIGS. 1, 4, and 5. Alternatively, reinforcing struts 122 could be made from flexible cable, plastic strapping or other strong, quiet, flexible, light weight materials. Positioning of the pack carrying seat assembly 14 in the tree stand mode is also defined by the co-linearity of extension legs 110 and 112 along tubular frame members 16 and 18, as may be seen in FIG. 2.

Securement of the pack frame and tree stand assembly, generally at 10 to a tree 62 or other similar, generally cylindrical upright member, such as a pole is effected in one embodiment by the use of an elongated rope or line 130, as seen in FIGS. 1 and 2. Line 130 may be attached at a first end to an eye bolt 132 which is bolted to frame flange 88. Alternatively, an aperature (not shown) could be formed in frame flange 88, the line passed therethrough, and knotted on the interior side of flange 88. Line 130 is of sufficient length to encircle a tree 62 to which the stand is to be attached. A rope encircling, tension actuated, sleeve assembly 134 is slideably carried on line 130. This sleeve assembly includes a semi-circular ring 136 at its free end with this ring being shaped and adapted to engage an outwardly extending headed knob 138 that is attached to frame flange 86. As shown in FIGS. 2 and 3, concave member 74 of frame 70, which is also smooth surfaced and does not damage the tree 62, is placed against tree 62 and line 130 is pulled through rope sleeve 134 whose free end ring 136 has been attached to headed knob 138. Since rope sleeve 134 is of the "Chinese finger trap" type, the free end of the line 130 can be pulled tight about the tree 62. Line 130 is placed about tree 62 in an over center manner and the seat frame and support platform are inclined upwardly so that as the tree stand is lowered from the orientation shown in FIG. 3 to the use position shown in FIG. 3, the line 130 will become tighter and will hold the tree stand firmly in place. To detach the tree stand from the tree, it is only necessary to reverse the attachment procedure; i.e., elevate the free or outboard end of platform 12 until the line 130 is slack, and then detach the ring portion 136 of sleeve 134 from knob 138. Alternatively, the ring portion 136 of rope sleeve 134 could be attached to an over center latch assembly (not shown) which would be pivotably carried by frame flange 86. This would limit the amount of tension that could be imparted to line 130 and would eliminate possible tree damage which could result from over tightening of line 130.

Figure 2A:
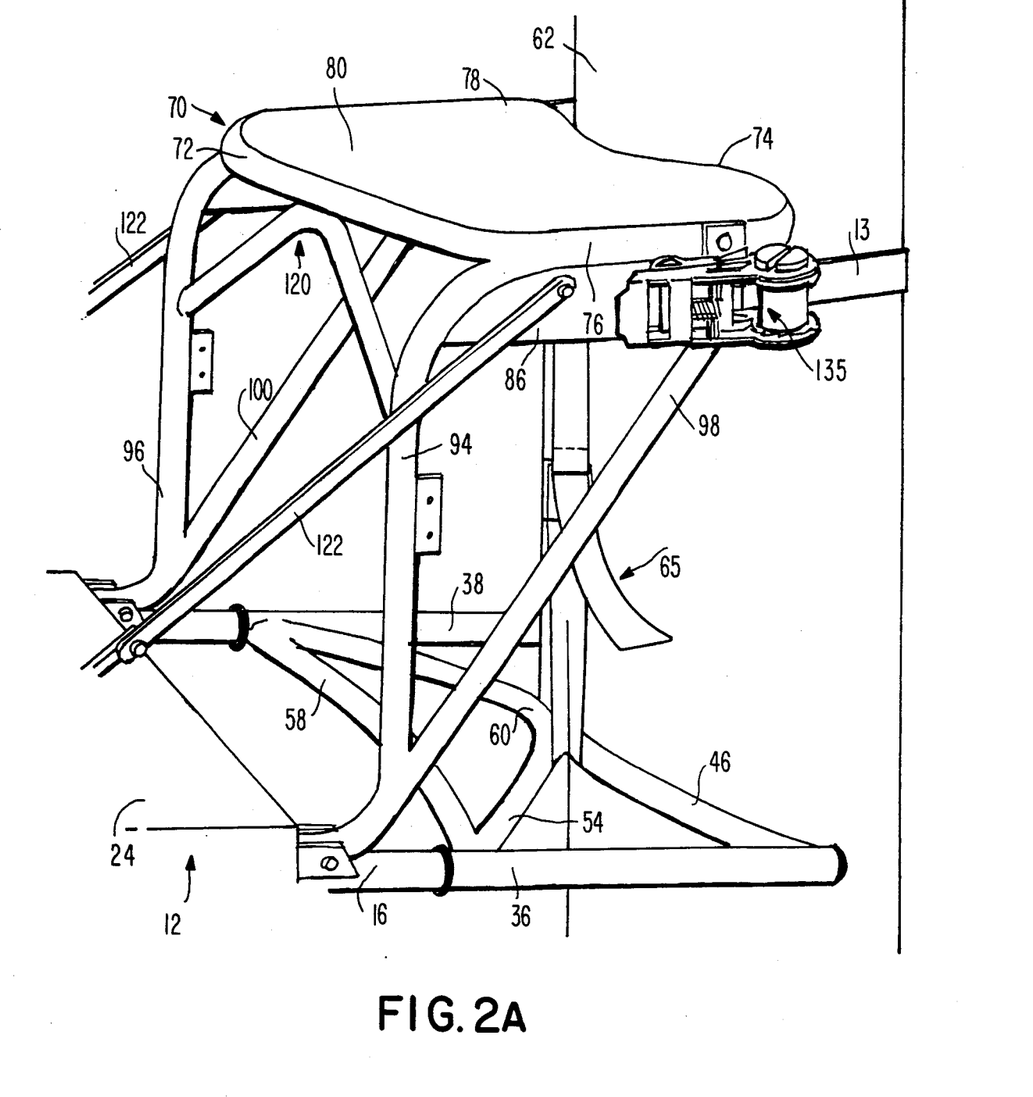
FIG. 2A is a perspective view generally similar to FIG. 1 and showing an additional stand stabilizing strap.

An alternate attachment assembly for securing the pack frame and tree stand assembly to a tree 62 or the like, is seen in FIGS. 1A and 2A. Instead of rope or line 130, a generally flat web belt 131 can be secured at a first end by passage through a slot 133 in frame flange 88, as seen in FIG. 1A. A generally well known ratchet strap tightening buckle 135 is attachable to the second, free end of web belt 131. This buckle 135 is attachable to frame flange 86 through the use of a generally conventional male and female key and slot assembly shown generally at 137. In use, the web belt 131 is adjusted in length through use of buckle 135. The belt 131 is passed around the tree 62 and the buckle 135 is secured to the flange 86. The tree stand can quickly be released from the tree, either by raising the outbound end to release tension on the belt 131, or by loosening of the belt 131 through ratchet buckle 135. This strap 131 is also usable to secure loads to the pack frame when the assembly is not being used as a tree strand and can also be used to hoist game off the ground as for dressing or skinning.

Once the tree stand assembly has been attached to the tree 62 by use of the line 130 or web belt 131, it is very stable and secure and cannot be dislodged under normal usage. However, if the tree stand were to be positioned in a tree at a sufficient height that the user had to climb up to it, it is possible that it could be dislodged by exertion of a downward pull on the inboard end of the back engaging support platform 12. To prevent this from possibly occuring, there is provided a stand stabilization strap 65 which includes a tightening buckle 66, as may be seen in FIG. 2A. Stand stabilization strap 65 extends between central reinforcing brace 79 of kidney shaped frame 70 and midpoint 60 of arcuate tubular member 46. Once the tree stand has been put in place in a tree, the stand stabilization strap 65 can be tightened. This prevents inadvertant downward motion of the inboard end of back engaging support platform 12 and prevents the stand from possibly being dislodged from the tree.

Referring to FIG. 4, there is shown pack frame and tree stand assembly, generally at 10, being utilized as a pack frame and having attached thereto a lower pack 82, which is supported on seat/shelf panel 80, and an upper pack 140 which may be attached to the elongated tubular frame members 16 and 18 of the back engaging support platform 12. Various pack configurations can readily be attached to the pack frame assembly and will be supported by seat/shelf panel 80 which, in the pack frame mode, acts as a shelf upon which the pack rests. Various other articles instead of packs can be supported on the shelf formed by panel 80 and kidney shaped tubular frame 70.

As is shown in FIG. 5, the back engaging support platform, generally at 12, is provided with suitable straps to facilitate its attachment to the user. A pair of padded shoulder straps 142 are attached, at their upper ends to tubular base member 58 of the isosceles reinforcing member. As may be recalled, this tubular base member 58 is part of the back engaging support platform frame extension 40 which is adjustable with respect to elongated tubular frame members 16 and 18. Thus, the position of the shoulder straps 142 can be adjusted by movement of frame extension 40, as may be seen in FIG. 5A. Tubular base member 58 carries a pair of spaced strap rings 144 that prevent the upper ends of the shoulder straps from sliding. A chest strap and chest buckle strap 146 and 148, respectively, are secured to shoulder straps 142. The lower ends of the shoulder straps 142 are formed with a waist encircling cinch strap 150 which is closed with an adjustable buckle 152. The waist cinch strap 150 is attached to the lower or outboard ends 126 and 128 of tubular frame members 16 and 18 by any suitable means such as by webbed belting or the like and encircles the waist of the wearer, as shown in FIG. 5A. It should be noted that these strap assemblies are generally well known for use with pack frames and are adapted only to the extend necessary so that they can be removed when the assembly in accordance with the present invention is converted for use as a tree stand. The transverse spaced frame tubes 20 and 22 are curved or bowed so that they will not strike the wearer's back. Also, an open weave mesh could be attached between elongated tubular frame members 16 and 18 to help support the pack frame 12 on the back of the user.

After the hunter has used the pack frame and tree stand assembly 10 as a pack frame, he removes the various packs and straps and sets the assembly up as a tree stand as shown in FIGS. 2, 2A and 3 and as has been discussed in some detail previously. As may be seen in FIG. 6, the tree stand mode of the present invention not only serves as a seat and support platform for the archery hunter but also supports his gear. A pair of spaced pins 154 are threadably or otherwise attachable to the outboard end 126 of tubular frame member 16 or to the outboard end 128 of tubular frame member 18, and serve to support an archer's bow 156. An arrow holder 158, which carries a plurality of arrows 160, is attachable to a mounting tab 162 carried by either of the straight frame legs 94 or 96 of the right triangular frame for the seat frame 70.

Figure 7A:
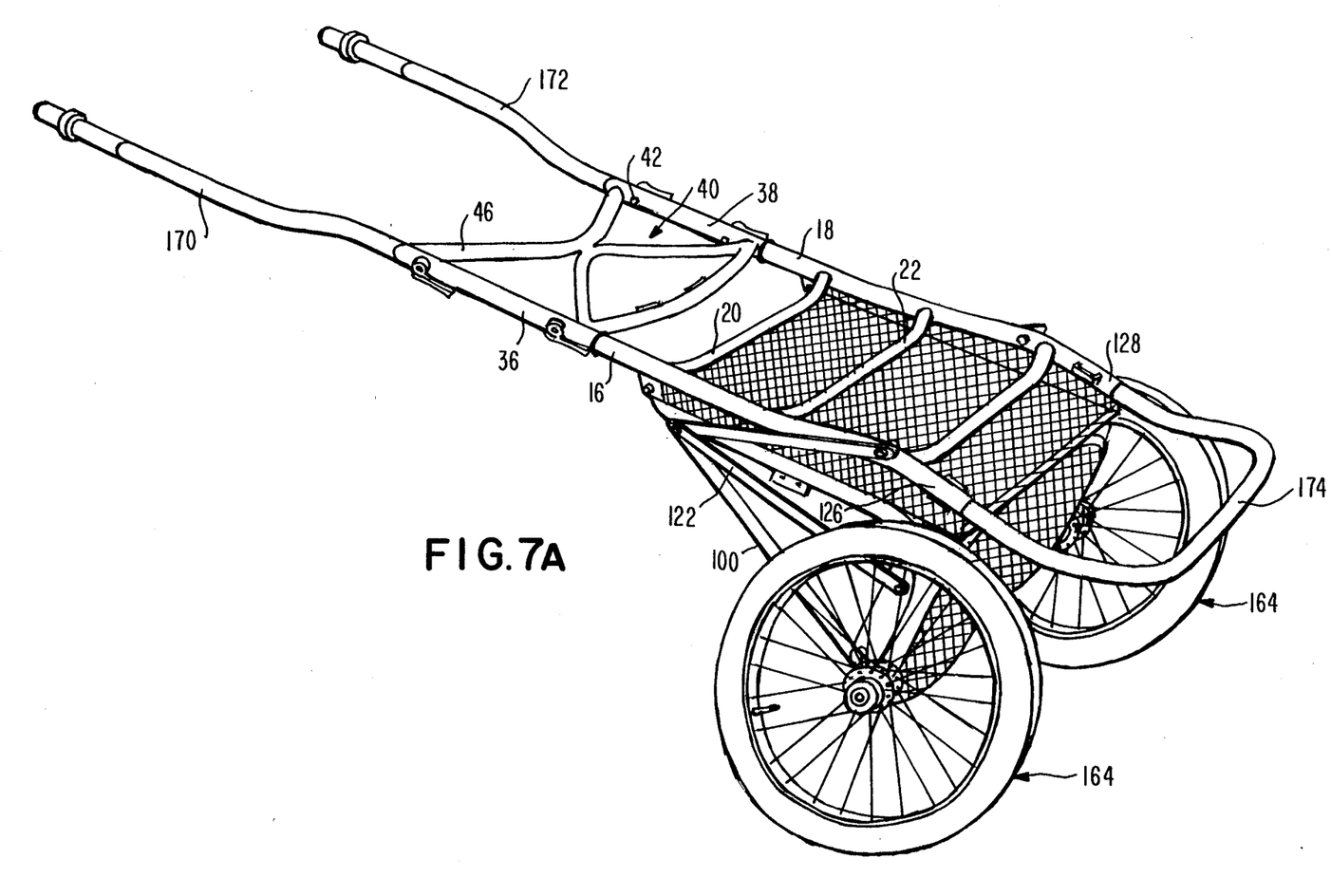
FIG. 7A is a perspective view of the wheeled litter and further including a litter extension loop.

Various other pieces of equipment and accessories can also be secured to the pack frame and tree stand assembly 10 to adapt the assembly for various uses. For example, as may be seen in FIGS. 7 and 7A the pack frame and tree stand assembly can be adapted for use as a litter. A pair of wheels 164 may be attached to the spaced rounded side frame portions 76 and 78 of generally kidney shaped shelf or seat frame 70 generally at the intersections of these side frame portions 76 and 78 with convex front frame member 72. Such attachment is facilitated by the provision of wheel attachment holes 166 and 168 formed in side frames 76 and 78 as seen; for example, in FIG. 1. The wheels 164 are similar to those used on collapsible wheelchairs and may carry their own axle shafts that are receivable in wheel attachment holes 166 and 168. Alternatively, these holes 166, 168 may serve as mounting points to which axles can be attached. The wheels 164 are then mounted on the axles. A pair of extension handles 170 and 172 are inserted into tubular frame extension members 36 and 38 once end caps 52 have been removed, and lock pins 42 are used to hold the handles in place. As may be seen in FIG. 7A, an extension loop 174 may also be attached to the outboard ends 126 and 128 of elongated frame members 16 and 18. Extension loop 174 is telescopingly receivable in the outboard ends 126, 128 and may be held there by lock pins 42 or by other suitable means. The extension loop 174 serves to increase the usable support surface of the litter. Thus, the litter may be used, for example, to haul an animal carcass to a registration station or the like or may be used for various tasks around a remote campsite.

Figure 7B:
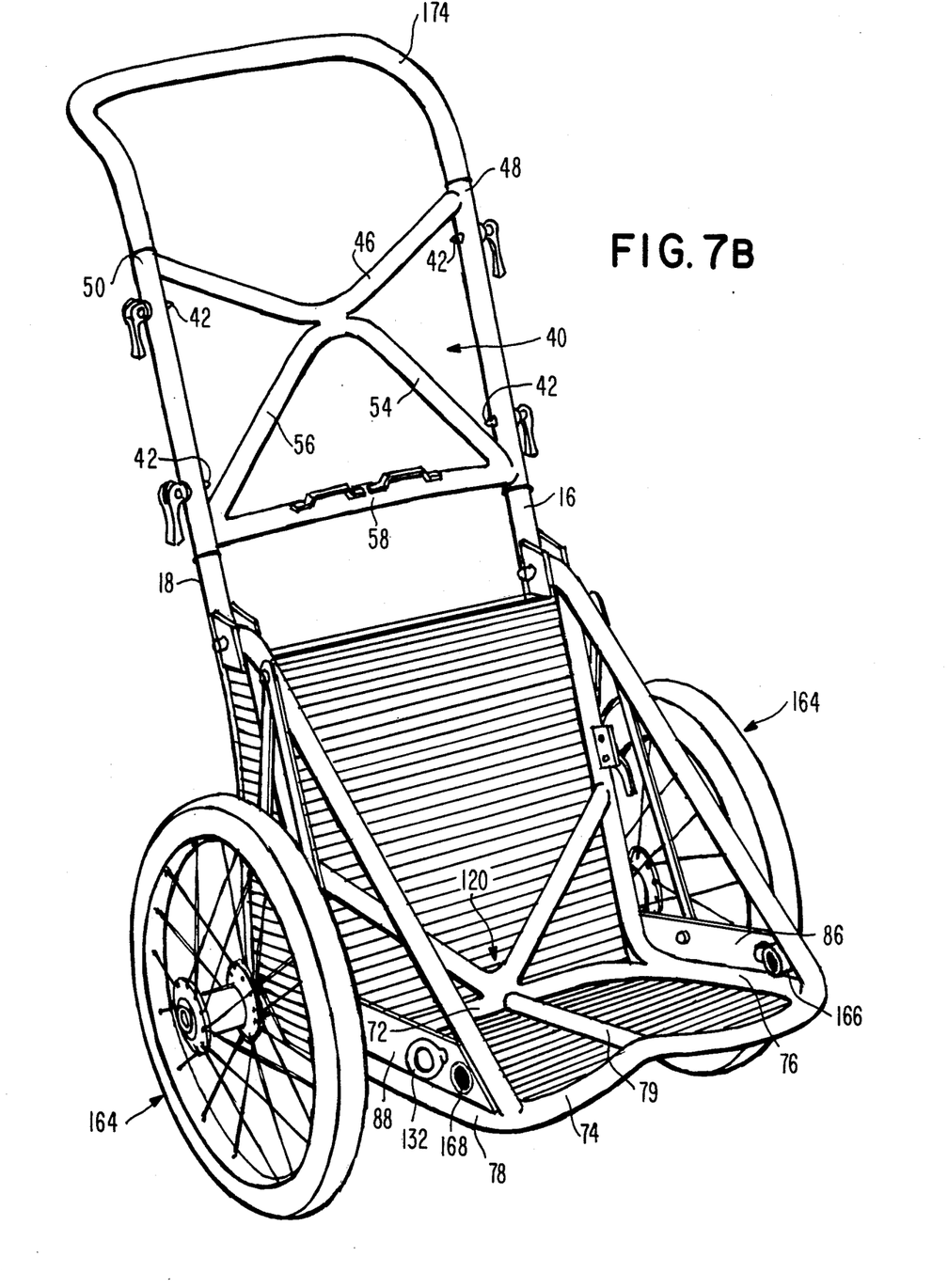
FIG. 7B is a perspective view of the pack frame and tree stand assembly of the present invention adapted for use as a hand truck.

Alternatively, the pack frame and tree stand can be used as a hand truck instead of a litter. As may be seen in FIG. 7B, use of the pack frame and tree stand as a hand truck is accomplished by positioning wheel assemblies 164 at the lower or outboard ends 126 and 128 of parallel, elongated frame members 16 and 18 of back engaging support platform 12. While not specifically shown, it will be understood that suitable mounting holes or other means will be provided to facilitate the attachment of the wheel assemblies 164 to the frame. In the hand truck mode, the extension loop 174 is telescopingly positioned within the ends 48 and 50 of support platform frame extension 40 and can be secured in place by suitable lock pins 42. Now instead of being pulled behind the person as a litter, the assembly can be pushed in front of a person as a hand truck. In the hand truck mode, the panel 80 and seat frame, generally at 70, act as a shelf upon which articles can be placed.

Figure 8:
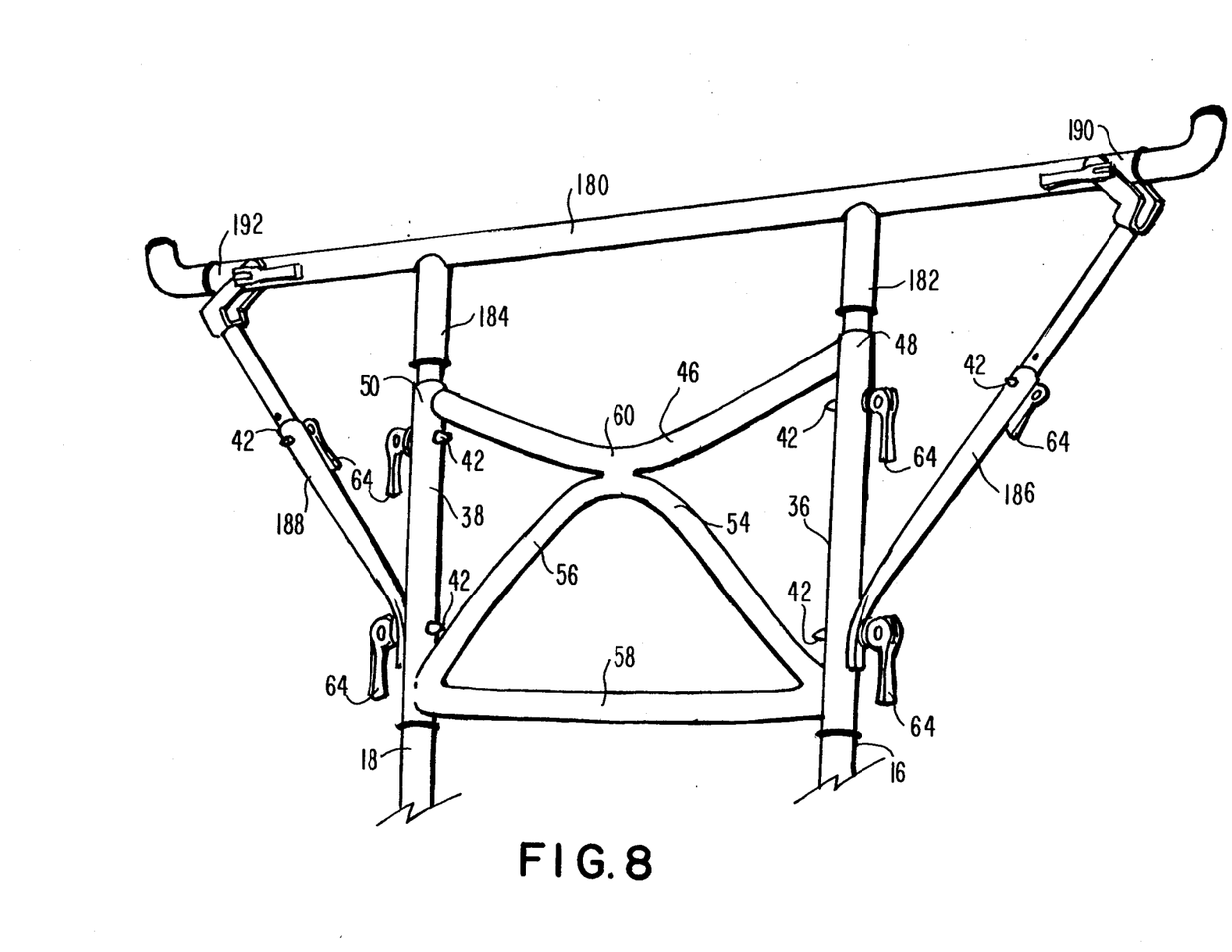
FIG. 8 is a perspective view of a top portion of the back engaging support platform in the pack frame mode and adapted for use as a canoe carrier.

Turning now to FIG. 8 there may be seen a further attachment for the pack frame and tree stand assembly 10 which aids in the carrying of a canoe. A canoe support bar 180 has a pair of spaced connector tubes 182 and 184 that are telescopingly receivable in the upper ends 48 and 50 of tubular frame extension members 36 and 38 in a manner similar to the extension handles 170, 172 or extension loop 174, discussed previously. Lock pins 42 are used to hold the connecter tubes 182, 184 in place. A pair of diagonal side braces 186 and 188 extend from outer ends 190 and 192 of canoe support bar 180 to the lower ends of tubular frame extension members 36 and 38. Canoe support bar 180 may be provided with upturned ends to prevent the canoe from sliding. In use, a canoe is inverted and its gunwales are placed on canoe support bar 180 which is positioned atop the back engaging support platform 16 and frame extension 40. The person carrying the pack frame can extend his arms upwardly and forwardly to securely grasp the canoe and stablize it during portage. The length of the connector tubes 182 and 184 and the lengths of the diagonal support braces 186 and 188 are adjustable. Further, the side braces 186 and 188 can be folded about the canoe support bar 180 to reduce the size of the assembly for ease in storage.

The pack frame and tree stand assembly in accordance with the present invention is, as was previously discussed, structured from light weight, strong, durable materials such as light weight, high strength alloy metal tubing and the like. It is intended to be strong, light weight, durable, quiet and generally usable in a wilderness situation. While its two primary functions are those of a tree stand and a pack frame, it is also adaptable to a number of related uses such as litter, canoe carrier, hand truck, and the like. It will be apparent to one of skill in the art that a number of changes in; for example, the type and shape of tubing used, the perforation pattern in the panels, the type of lock pins, the exact structure of the pack frame packs and straps, the size of the litter wheels, the particular length and shape of the canoe bar and the like could be made without departing from the true spirit and scope of the pack frame and tree stand assembly in accordance with the present inven-

I claim:

1. A pack frame and tree stand assembly comprising:
   a back engaging support platform having a pair of spaced, parallel, elongated, frame members and a support panel secured between said pair of spaced parallel elongated frame members;
   a back engaging support platform extension frame secured at a first end of said back engaging support platform; and
   a pack carrying seat attached to first ends of spaced pivotable frame members, second ends of said spaced pivotable frame members being pivotably attached to said spaced parallel elongated frame members intermediate their ends, said pack carrying seat and said spaced pivotable frame members being rotatable through an angle of generally about 90°.

2. The pack frame and tree stand assembly of claim 1 wherein said pair of spaced parallel elongated frame members are secured together by spaced transverse frame cross members to define a generally rectangular back engaging support panel.

3. The pack frame and tree stand assembly of claim 1 wherein said spaced parallel elongated frame members are of reduced size at said first end and are telescopingly positionable within frame extension members of said back engaging support platform frame extension.

4. The pack frame and tree stand of claim 3 wherein said back engaging support platform frame extension is adjustably positionable on said first ends of said elongated frame members.

5. The pack frame and tree stand assembly of claim 1 wherein said back engaging support platform extension frame includes spaced parallel frame extension members extending generally co-extensively with said spaced parallel elongated frame members and having an arcuate member extending therebetween at a point remote from said first end of said back engaging support platform.

6. The pack frame and tree stand of claim 5 wherein said back engaging support platform extension frame is generally rectangular and includes a generally isosceles triangle shaped reinforcement member.

7. The pack frame and tree stand of claim 1 wherein said pack carrying seat is a generally kidney shaped frame having a planar seat/shelf panel secured thereto.

8. The pack frame and tree stand assembly of claim 7 wherein said generally kidney shaped frame includes a generally concave portion, said concave portion abutting a tree when said assembly is used as a tree stand.

9. The pack frame and tree stand of claim 1 wherein said pack carrying seat has a first end of an elongated line affixed thereto and further has means for securement thereto of a second end of said line after said line has encircled a tree when said assembly is used as a tree stand.

10. The pack frame and tree stand assembly of claim 7 wherein said generally kidney shaped frame is generally parallel to said back engaging support platform when said assembly is used as a tree stand.

11. The pack frame and tree stand assembly of claim 7 wherein said generally kidney shaped frame is generally perpendicular to said back engaging support platform when said assembly is used as a pack frame.

12. The pack frame and tree stand assembly of claim 1 wherein each of said pivotable frame members is generally shaped as a right triangle.

13. The pack frame and tree stand assembly of claim 12 wherein diagonal frame legs of said pivotable frame members form the hypotenuse of said right triangles and further wherein extension legs of said diagonal frame legs are pivotably attached to spaced ears secured to said spaced parallel elongated frame members.

14. The pack frame and tree stand assembly of claim 1 further including reinforcing struts extending between said pack carrying seat and said spaced parallel elongated frame members.

15. The pack frame and tree stand assembly of claim 1 further including wheels attached to said pack carrying seat whereby said assembly is usable as a litter.

16. The pack frame and tree stand assembly of claim 1 further including wheels attached to said back engaging support platform whereby said assembly is usable as a hand truck.

17. The pack frame and tree stand assembly of claim 1 further including a canoe support bar securable to said back engaging support platform extension frame at a point remote frame said extension frame's point of attachment to said back engaging support platform.

* * * * *